United States Patent
Xu et al.

(10) Patent No.: US 11,326,683 B2
(45) Date of Patent: May 10, 2022

(54) GEAR MANUFACTURING PROCESS

(71) Applicant: GM GLOBAL TECHNOLOGY OPERATIONS LLC, Detroit, MI (US)

(72) Inventors: Hai Xu, Northville, MI (US); Jeffrey N. Heaton, White Lake, MI (US); Scott M. Neher, Bloomfield Hills, MI (US); Brian T. King, Rochester Hills, MI (US); Syed M. Raza, Canton, MI (US); Travis Bussell, Allendale, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 449 days.

(21) Appl. No.: 16/437,536

(22) Filed: Jun. 11, 2019

(65) Prior Publication Data

US 2020/0393035 A1    Dec. 17, 2020

(51) Int. Cl.
| | |
|---|---|
| *F16H 57/00* | (2012.01) |
| *F16H 57/023* | (2012.01) |
| *F16H 48/08* | (2006.01) |
| *B23F 9/02* | (2006.01) |
| *B23P 15/00* | (2006.01) |
| *F16H 48/38* | (2012.01) |

(52) U.S. Cl.
CPC ......... *F16H 57/0006* (2013.01); *B23F 9/025* (2013.01); *B23P 15/00* (2013.01); *F16H 48/08* (2013.01); *F16H 57/023* (2013.01); *F16H 2048/382* (2013.01)

(58) Field of Classification Search
CPC .... F16H 57/0006; F16H 48/08; F16H 57/023; F16H 2048/382; B23F 9/025; B23P 15/00
See application file for complete search history.

(56) References Cited

U.S. PATENT DOCUMENTS

| | | | | |
|---|---|---|---|---|
| 3,280,624 A | * | 10/1966 | Weinert | G01H 3/00 73/162 |
| 3,405,557 A | * | 10/1968 | Sinke, Jr. | G01M 13/021 73/162 |
| 2006/0111018 A1 | * | 5/2006 | Kopp | B23F 23/1218 451/5 |
| 2017/0261068 A1 | | 9/2017 | Zhao et al. | |

* cited by examiner

*Primary Examiner* — Rick K Chang
(74) *Attorney, Agent, or Firm* — Quinn IP Law

(57) ABSTRACT

A method for controlling a process for manufacturing a bevel gear includes forming, via a first process, a ring gear and determining a first set of parameters associated with the ring gear, and forming, via a second process, the pinion gear, and determining a second set of parameters associated with the pinion gear. The ring gear and the pinion gear are paired, and a single-flank test is executed on the paired ring gear and pinion gear to determine a third set of parameters. The paired ring gear and pinion gear are assembled into a final assembly, and an end-of-line noise/vibration analysis of the final assembly is executed. The noise/vibration analysis, the first set of parameters, the second set of parameters, and the third set of parameters are evaluated, and one of the first process, the second process, the pairing process, and the assembly process are adjusted based thereon.

19 Claims, 6 Drawing Sheets

| Axle Serial | Axle Serial | Mating Ring | Ring | Mated Pinion | Pinion |
|---|---|---|---|---|---|
| 8320ADJLX0750 | EAEC1828420111 | EU1A1831920218 | 8301010126ZU3623 | EV1A1831920218 | 8304052578653626 |
| 8320ADJLX0758 | EAEC1828420264 | EU1A1831920220 | 8301009923ZU3623 | EV1A1831920220 | 8304052578653626 |
| 8320ADJLX0759 | EAEC1828420266 | EU1A1831920221 | 8301011927ZU3623 | EV1A1831920221 | 8304019678653626 |
| 8320ADJLX0760 | EAEC1828420115 | EU1A1831920222 | 8301012124ZU3623 | EV1A1831920222 | 8304048578653626 |
| 8320ADJLX0792 | EAEC1828820124 | EU1A1831920249 | 8302021925ZU3623 | EV1A1831920249 | 8304053078653626 |
| 8320ADJLX0790 | EAEC1828820116 | EU1A1831920219 | 8297014123OP3623 | EV1A1831920219 | 8304026778653626 |
| 8320ADJLX0802 | EAEC1828820336 | EU1A1831920233 | 8301010522ZU3623 | EV1A1831920233 | 8304050378653626 |
| 8320ADJLX0801 | EAEC1828820334 | EU1A1831920206 | 8296029822OP3623 | EV1A1831920206 | 8304008278653626 |
| 8320ADJLX0796 | EAEC1828820123 | EU1A1831920209 | 8302031123ZU3623 | EV1A1831920209 | 8305072974353626 |
| 8320ADJLX0800 | EAEC1828820333 | EU1A1831920207 | 8301010327ZU3623 | EV1A1831920207 | 8304051978653626 |
| 8320ADJLX0797 | EAEC1828820129 | EU1A1831920213 | 8301028827ZU3623 | EV1A1831920213 | 8305040978653626 |
| 8320ADJLX0816 | EAEC1828820274 | EU1A1831920231 | 8302032224ZU3623 | EV1A1831920231 | 8305078274353626 |
| 8320ADJLX0814 | EAEC1828820308 | EU1A1831920355 | 8301016827ZU3623 | EV1A1831920355 | 8305048678653626 |
| 8320ADJLX0808 | EAEC1828420335 | EU1A1831920212 | 8301012424ZU3623 | EV1A1831920212 | 8304061278653626 |
| 8320ADJLX0805 | EAEC1828820119 | EU1A1831920216 | 8296031823OP3623 | EV1A1831920216 | 8304053478653626 |
| 8320ADJLX0806 | EAEC1828620033 | EU1A1831920302 | 829Y046824ZU3623 | EV1A1831920302 | 8284016274353626 |
| 8320ADJLX0817 | EAEC1828820333 | EU1A1831920228 | 8297043727ZU3623 | EV1A1831920228 | 8305002178653626 |
| 8320ADJLX0807 | EAEC1828820035 | EU1A1831920301 | 8295040928OP3623 | EV1A1831920301 | 8304073178653626 |
| 8320ADJLX0818 | EAEC1828820326 | EU1A1831920229 | 8296009425OP3623 | EV1A1831920229 | 8305002878653626 |
| 8320ADJLX0819 | EAEC1828820331 | EU1A1831920232 | 8295024824OP3623 | EV1A1831920232 | 8304049378653626 |
| 8320ADJLX0820 | EAEC1828820197 | EU1A1831920226 | 8297044425ZU3623 | EV1A1831920226 | 8304054378653626 |
| 8320ADJLX0001 | EAEC1828820328 | EU1A1831920225 | 8301013224ZU3623 | EV1A1831920225 | 8304048778653626 |

*FIG. 4*

GEAR MANUFACTURING PROCESS

INTRODUCTION

Gear noise, i.e., noise that is generated by rotational meshing of paired gears such as may be contained in a gearbox, can negatively affect quality perceptions. When paired gears are deployed on-vehicle, the gear noise may be propagated through a driveline to a passenger compartment, and thus negatively affect a perception of the vehicle, leading to customer dissatisfaction. One present industry practice for matching axle hypoid gears is based on trial and error lapping, with assembly based on pattern matching. One outcome is that first-time quality levels may be lower than desired. Thus, there is a need for an improved method for manufacturing and assembling paired gears, such as bevel gears and hypoid gears that are employed in differentials.

SUMMARY

A method and associated arrangement for controlling a process for manufacturing a bevel gear is described, wherein the bevel gear includes a ring gear that is meshingly engaged to a pinion gear. One embodiment of a bevel gear is in the form of a hypoid gear. The method includes forming, via a first process, the ring gear and determining a first set of parameters associated with the ring gear. The method further includes forming, via a second process, the pinion gear, and determining a second set of parameters associated with the pinion gear. The ring gear and the pinion gear are paired, via a pairing process, including meshingly engaging the ring gear and the pinion gear, and executing a single-flank test on the paired ring gear and pinion gear and determining a third set of parameters. The paired ring gear and pinion gear are assembled into a final assembly via an assembly process, and an end-of-line noise/vibration analysis of the final assembly is executed. The noise/vibration analysis, the first set of parameters, the second set of parameters, and the third set of parameters are evaluated, and one of the first process, the second process, the pairing process, and the assembly process are adjusted based upon the evaluation.

An aspect of the disclosure includes selecting a differential bearing shim and selecting a pinion shim, wherein adjusting the assembly process based upon the evaluation of the noise/vibration (NV) analysis includes adjusting a size of one of the differential bearing shim and the pinion shim.

Another aspect of the disclosure includes executing a single-flank test of the meshingly engaged paired ring gear and pinion gear, and wherein assembling, via the assembly process, the paired ring gear and pinion gear into the final gear assembly includes selecting a differential bearing shim and selecting a pinion shim based upon the single-flank test of the meshingly engaged paired ring gear and pinion gear.

Another aspect of the disclosure includes executing the single-flank test at multiple pinion positions and a constant backlash.

Another aspect of the disclosure includes executing the noise/vibration test of the final gear assembly by subjecting the final gear assembly to fixed-speed, torque sweep conditions and concurrently monitoring noise/vibration parameters.

Another aspect of the disclosure includes subjecting the final gear assembly to fixed-speed, torque sweep conditions and concurrently monitoring noise/vibration parameters by operating the final gear assembly at a preset speed and varying torque being transmitted through the final assembly to sweep between a maximum positive torque and a maximum negative torque, and coincidently determining a magnitude of noise/vibration generated by the final assembly.

Another aspect of the disclosure includes executing the noise/vibration test of the final gear assembly by subjecting the final gear assembly to fixed-torque, speed sweep conditions and concurrently monitoring noise/vibration parameters.

Another aspect of the disclosure includes executing the noise/vibration test of the final gear assembly by subjecting the final gear assembly to fixed-speed conditions and executing incremental step changes in torque from a maximum positive torque condition to a maximum negative torque condition and concurrently monitoring noise/vibration parameters.

Another aspect of the disclosure includes evaluating the first set of parameters, the second set of parameters, and the third set of parameters based upon results of the noise/vibration test by executing a correlation analysis between the first set of parameters, the second set of parameters, the third set of parameters and the results of the noise/vibration test.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 4 shows, in tabular form, a portion of a dataset associated with tracking individual ring and pinion gears by serial number, in accordance with the disclosure.

The appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

Figure 1:
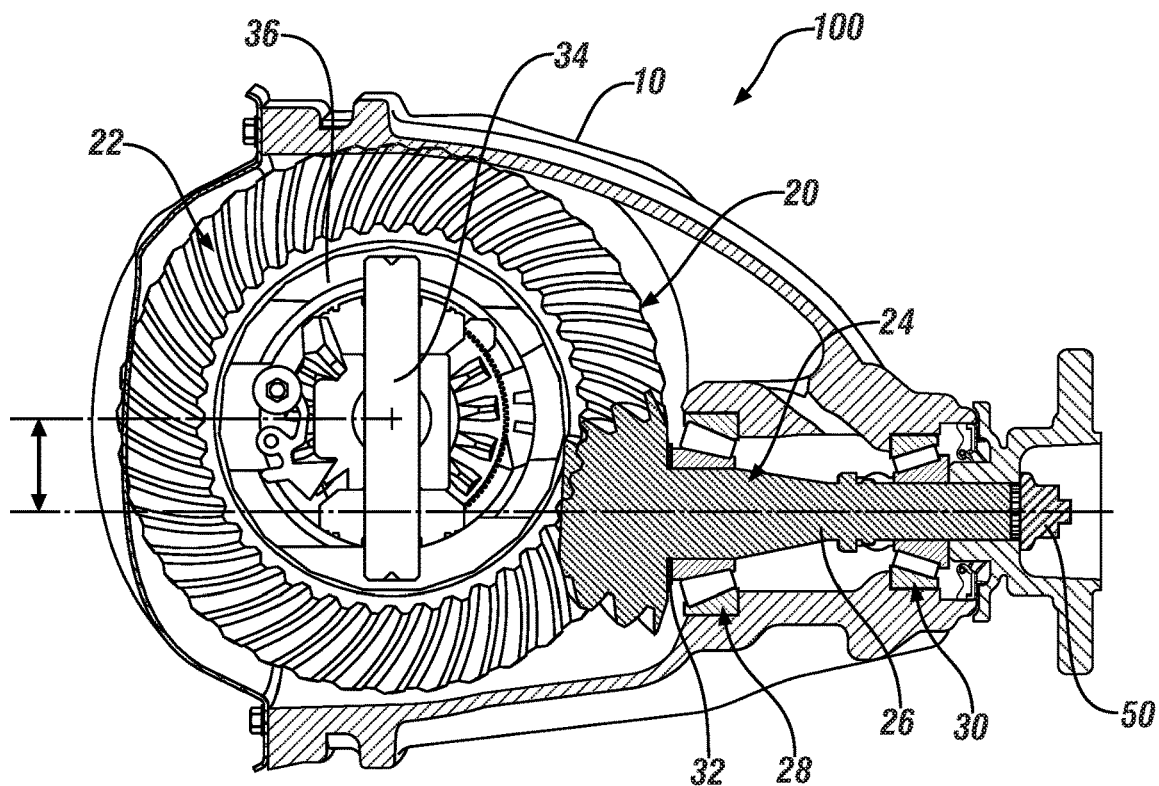
FIG. 1 shows a side-view cutaway schematic drawing of an embodiment of a differential assembly, in accordance with the disclosure.
Figure 2:
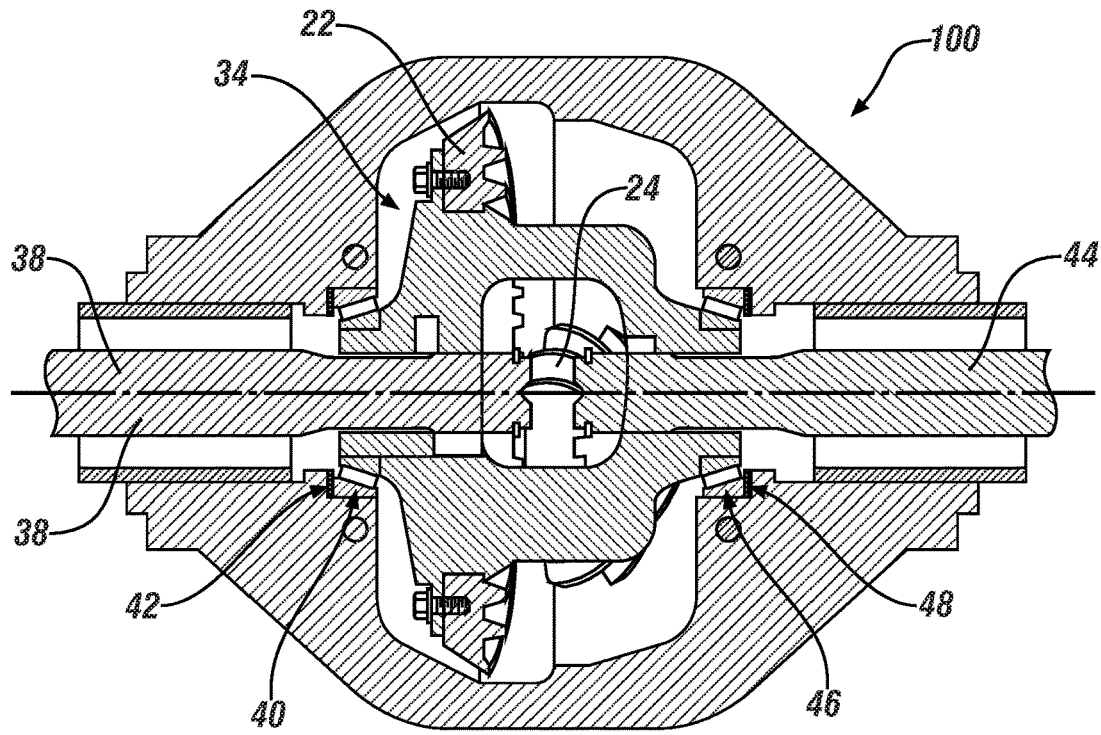
FIG. 2 shows a rear-view cutaway schematic drawing of an embodiment of a differential assembly, in accordance with the disclosure.

Referring to the drawings, wherein like reference numerals correspond to like or similar components throughout the several Figures, FIGS. 1 and 2, consistent with embodiments disclosed herein, schematically illustrate a differential assembly 100, which includes a hypoid gear assembly 20 that is disposed in a housing 10. The hypoid gear assembly 20 includes a ring gear 22 that is meshingly engaged with a pinion gear 24. A hypoid gear assembly 20 is a style of spiral bevel gear whose mating gears' axes do not intersect. The hypoid gear assembly 20 include the ring gear 22 being arranged offset from a gear center of the pinion gear 24, allowing unique configurations and a large diameter shaft. The teeth on a hypoid gear are helical, and the pitch surface may be described as a hyperboloid. The ring gear 22 and the pinion gear 24 each have multiple teeth formed on a conical surface that are cut at a specified spiral angle and include a tooth convex surface and a tooth concave surface that are curved to follow the spiral angle. The ring gear 22 meshes with the pinion gear 24 to bring the tooth convex surfaces into contact with the tooth concave surfaces.

The ring gear 22 interfaces with a differential gear 34, which is contained in a differential gear housing 36. The differential gear 34 is coupled to a left axle 38 and a right axle 44, with corresponding left bearing 40 and right bearing 46. A left bearing shim 42 is interposed between the left bearing 40 and the housing 10, and a right bearing shim 48 is interposed between the right bearing 46 and the housing 10. The pinion gear 24 includes a pinion shaft 26 which couples to a driveshaft 50. The pinion gear 24 is disposed in the housing via a head bearing 28 and a tail bearing 30. The tail bearing 30 is disposed in the housing 10 proximal to the driveshaft 50, and head bearing 28 is disposed in the housing 10 proximal to the ring gear 22. A pinion shim 32 is interposed between the pinion gear 24 and the head bearing 28. The thicknesses of the left and right bearing shims 42, 48 and the pinion shim 32 are selectable during manufacturing of the differential assembly 100.

Figure 3:
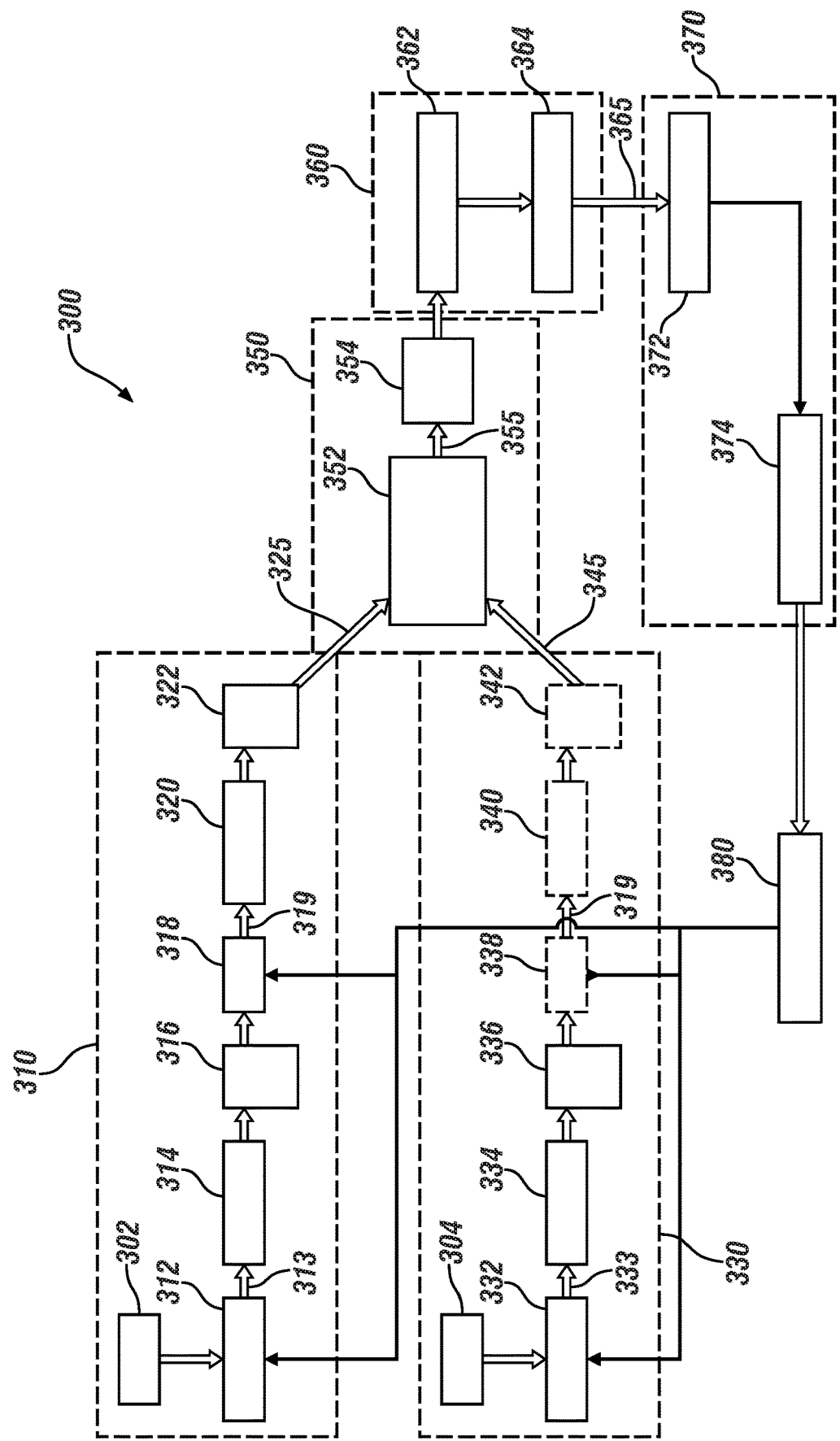
FIG. 3 schematically shows a fabrication process for forming a differential assembly, in accordance with the disclosure.

FIG. 3 schematically shows portions of a process 300 for manufacturing an embodiment of the differential assembly 100, including the hypoid gear assembly 20 that includes ring gear 22 and pinion gear 24 as described with reference to FIGS. 1 and 2. The process 300 includes a first gear forming event 310, a second gear forming event 330, a pairing process 350, a final assembly event 360, a noise/vibration testing and evaluation 370, and a process adjustment step 380.

Gear teeth can be produced entirely by grinding, entirely by cutting, or by first cutting and then grinding to the required dimensions. Gear grinding is performed after a gear has been cut and heat-treated to a high hardness, and may be beneficial for parts above 350 HB (38 HRC), where cutting becomes very difficult. Inspection of ground gears may involve both magnetic particle inspection as well as macro-etching with dilute nitric acid.

A parameter is defined as a measurable quantity that represents a physical property of a device or other element that is discernible using one or more sensors and/or a physical model. A parameter can have a discrete value, e.g., either "1" or "0", or can be infinitely variable in value. Control parameters associated with gear forming include tooth form specifications, i.e., tooth geometry, and tool setup parameters, including, e.g., grinder setup.

As described herein, the first gear forming event 310 includes a progressive series of process steps that may be executed to form an embodiment of the ring gear 22. The first gear forming event 310 begins with a ring gear blank 302, which may be in the form of a piece of raw steel having an outer three-dimensional shape that is equivalent to the outer shape of the ring gear 22. The ring gear blank 302 is subjected to a tooth-cutting process 312 to cut gear teeth. The tooth-cutting process 312 may include face milling, face hobbing, or another process that may be CNC-controlled to generate teeth in the ring gear blank 302 that have pre-defined, requisite shapes. Processes that define gear geometry and tooth shapes for a ring gear of a hypoid gear assembly, etc., are understood and not described in detail. After being cut by the tooth-cutting process 312, the cut ring gear 313 is measured employing a first measurement process 314. The first measurement process 314 includes, in one embodiment, a coordinate measurement system that measures the three-dimensional geometry of the cut ring gear 313 by sensing discrete points on the surface of the respective gear employing a scanning probe and a gear feature form. Gear feature forms are understood by a person having ordinary skill in the art, and thus are not described herein. By way of a non-limiting example, the American National Standards Institute establishes a classification system (ANSI/AGMA ISO 17485-A08) that can be used to communicate geometrical accuracy specifications of unassembled bevel gears, hypoid gears, and gear pairs. It defines gear tooth accuracy terms, and specifies the structure of the gear accuracy grade system and allowable values. A set of parameters associated with the first measurement process 314 may include tooth form specifications that are related to tooth geometry, and may include pressure angle, and associated pressure angle deviation; spiral angle, and associated spiral angle deviation; tooth thickness, run-out, profile crowning, and lengthwise crowning.

Each of the ring gear blanks 302 has an associated unique serial number, and the results of the first measurement process 314 are captured and indexed such that the results are individually identifiable by serial number and traceable throughout the process 300. One example of a serial number tracking system is shown with reference to FIG. 4. The cut ring gear 313 may be subjected to a heat treatment process 316, and then subjected to a grinding process 318 to form a cut-ground ring gear 319. The grinding process 318 may be optional when the tooth-cutting process 312 includes hobbing. After the grinding process 318 is completed, the cut-ground ring gear 319 is subjected to a second measurement process 320, which is analogous to the first measurement process 314. A set of parameters associated with the second measurement process 320 are captured and indexed such that the results are individually identifiable by serial number and traceable throughout the process 300. The cut-ground ring gear 319 may be subjected to a secondary process, such as shot-peening 322 to form the finished ring gear 325.

The second gear forming event 330 includes a progressive series of process steps that may be executed to form an embodiment of the pinion gear 24. The second gear forming event 330 begins with a pinion gear blank 304, which may be in the form of a piece of raw steel having an outer three-dimensional shape that is equivalent to the outer shape of the pinion gear 24. The pinion gear blank 304 is subjected to a tooth-cutting process 332 to cut gear teeth. The tooth-cutting process 332 may include face milling, face hobbing, or another process that may be CNC-controlled to generate teeth in the pinion gear blank 304 that have pre-defined, requisite shapes. Processes that define gear geometry and tooth shapes for a pinion gear of a hypoid gear assembly, etc., are understood and not described in detail. After having been cut by the tooth-cutting process 332, the cut pinion gear 333 is measured employing a third measurement process 334 to determine a set of parameters. The third measurement process 334 is analogous to the first measurement process 314, and includes, in one embodiment, a coordinate measurement system that measures the three-dimensional geometry of the cut pinion gear 333 by sensing discrete points on the surface of the gear employing a scanning probe and a gear feature form. Each of the pinion gear blanks 304 has an associated unique serial number, and the results of the first measurement process 314 are captured and indexed such that the results are individually identifiable by serial number and traceable throughout the process 300. The cut pinion gear 333 may be subjected to a heat treatment process 336. The cut pinion gear 333 be subjected to a grinding process 338 to form a cut-ground pinion gear 339, although this step may optional when the tooth-cutting process 332 includes hobbing. After the grinding process 338 is completed, the cut-ground pinion gear 339 is subjected to a fourth measurement process 340, which is analogous to the first measurement process 314. A set of parameters associated with the fourth measurement process 340 are captured and indexed such that the results are individually identifiable by serial number and traceable throughout the process 300. The cut-ground pinion gear 339 may be subjected to a secondary process, such as shot-peening 342 to form the finished pinion gear 345.

The finished ring gear 325 and the finished pinion gear 345 are paired and subjected to a lapping process 352 to produce a paired ring-pinion gearset 355. The lapping process 352 improves dimensional accuracy, corrects minor imperfection, refines surface finish and produces close fit between mating surfaces.

After a gear is manufactured, it may still need to be finished in order to improve the surface finish and dimensional accuracy. A gear may be finished in several different ways, such as lapping or grinding. Gear lapping is the process of imparting a refined surface finish and a smooth meshing between the contacting tooth surfaces of a ring gear and a pinion gear. By running mating pairs together in a gear lapping machine and feeding a liquid abrasive lapping compound under pressure into the tooth mesh of the gear pair, small amounts of metal are removed as the gears rotate at a certain speed and a light torque in a few predefined mesh positions, thus refining the tooth surface and achieving the desired contact pattern. Gear lapping improves the wear properties of gear teeth, and corrects the minute errors in tooth profile, spiral angle, tooth spacing and concentricity created in the forming, cutting or in the heat treatment of the gears. Therefore, gear lapping is most often applied to sets of hardened gears that must run silently in service. It is appreciated that gear lapping is a mating process; two gears that have been matched by lapping are operated as a set, and also replaced as a set, rather than singly. Gear lapping may be characterized in terms of lap geometry, lap coverage, lap passes, lap torque, lap speed, contact pattern and MTE (Motion Transmission Error) etc. The gear lapping process may be controlled by controlling setup of the lapper.

The paired ring-pinion gearset 355 is subjected to a single-flank test (SFT) 354. With single-flank testing, mating gears roll together at their proper mounting distance with backlash and with only one flank in contact. Testing gears in this manner simulates operation of the gears in their application. Gears can be tested by pairs, or with master gears. The single-flank test is run using optical encoders, which measure rotational motion (angular displacement error). Encoders may be attached to the input and output shafts of a machine for testing pairs of gears. The encoders may also be used portably by attaching them directly to the input and output shafts of an actual gear box so as to inspect the quality of a complete train of gears. Data from the encoders is processed in an instrument that shows the accuracy or smoothness of rotational motion resulting from the meshing of the gears (transmission errors). This data can be directly related to portions of overall flank form deviation, profile errors, spiral angle errors, pitch variation, runout and accumulated pitch variation. The single-flank test 354 permits measurement of profile conjugacy, which is the parameter that most closely relates to typical gear noise.

A set of parameters associated with the results of the single-flank test 354 are captured and indexed such that the results are individually identifiable by serial number and traceable throughout the process 300.

In assembly, a shim call is related to the target build position. Shim amount is selected to place the ring and pinion at targeted build positions by considering housing dimensions, bearing heights as well as an additional shim offset that may be determined from an experimentally-determined positional analysis. The positional analysis is a further refinement of the selected position from SFT to place the gearset at an optimum target position for end of line (EOL).

The final assembly event 360 includes a build-to-position process 362, wherein the ring and pinion positions are determined by pinion and gear mounting distances, which are selected from the SFT 354 based on results of a SFT search that is performed at multiple pinion positions and a constant backlash. The final assembly event 360 also includes subjecting the paired ring-pinion gearset 355 to a phosphate coating process 364, and assembling the paired ring-pinion gearset 355 into the housing 10 of the differential assembly 100, as shown with reference to FIGS. 1 and 2. The assembling of the paired ring-pinion gearset 355 includes selecting and inserting the pinion shim 32 on the pinion shaft 26 between the pinion gear 24 and the head bearing 28, and selecting and inserting the left and right differential bearing shims 42, 48 between the differential gear housing 36 and the differential housing 10 to form the final differential assembly 365, which is analogous to the differential assembly 100 that is described with reference to FIGS. 1 and 2.

The final differential assembly 365 is subjected to a noise/vibration testing and evaluation step 370, which includes a noise/vibration test 372 and analysis step 374.

The noise/vibration test 372 includes, in one embodiment, subjecting the final differential assembly 365 to various operating conditions and concurrently monitoring audible noise and/or vibration levels emanating from the final differential assembly 365. One example of the noise/vibration test 372 includes operating the final differential assembly 365 at a fixed rotational speed and executing a torque sweep from a maximum positive torque condition to a maximum negative torque condition while concurrently monitoring parameters associated with noise/vibration that emit from the final differential assembly 365. This example of the noise/vibration 372 may be executed at each of a plurality of rotational speeds between a minimum rotational speed and a maximum rotational speed. One example of the noise/vibration test 372 includes operating the final differential assembly 365 at a fixed speed and executing incremental step changes in torque from a maximum positive torque condition to a maximum negative torque condition while concurrently monitoring parameters associated with noise and vibration that emit from the final differential assembly 365. One example noise/vibration test 372 includes operating the final differential assembly 365 at a fixed torque and executing a speed sweep from a maximum positive speed to a maximum negative speed while concurrently monitoring parameters associated with noise/vibration that emit from the final differential assembly 365. One example includes operating the final differential assembly 365 at a fixed speed and a fixed torque while concurrently monitoring parameters associated with noise/vibration that emit from the final differential assembly 365.

Figure 5:
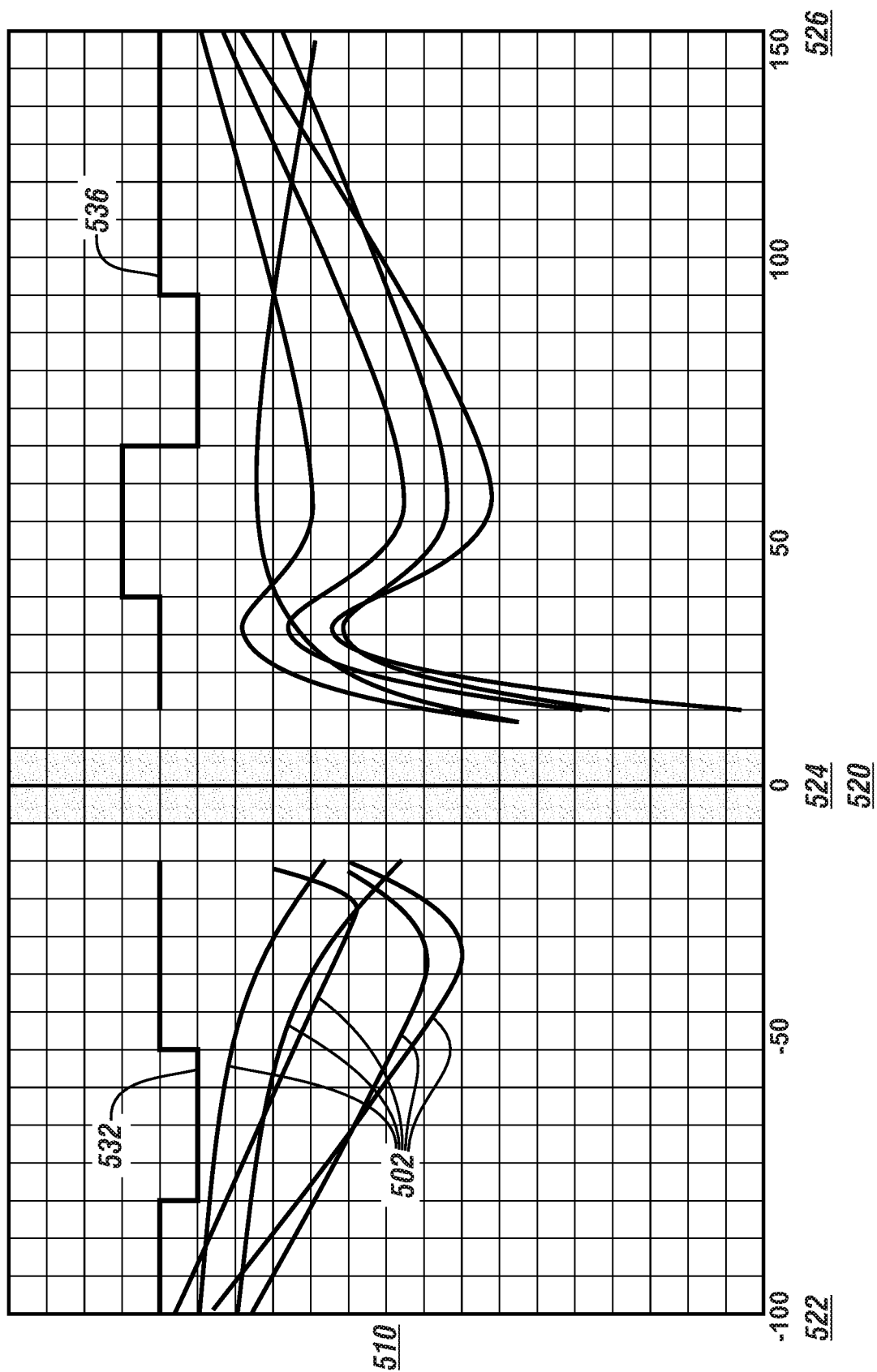
FIG. 5 graphically shows raw data in the form of noise levels associated with operating a plurality of samples of a final differential assembly being operated at a fixed rotational speed while a torque sweep is executed from a maximum positive torque condition to a maximum negative torque condition, in accordance with the disclosure.

A set of parameters associated with the noise/vibration test 372 may include noise levels in relation to torque. FIG. 5 graphically shows raw data in the form of a plurality of noise emissions 502 that are generated by operating a plurality of samples of an embodiment of the final differential assembly 365, wherein each of the samples is operated at a fixed rotational speed while a torque sweep is executed from a maximum positive torque condition to a maximum negative torque condition. As shown graphically, noise level 510 are indicated on the vertical axis in decibels, and torque conditions 520 are indicated on the horizontal axis, including a maximum negative torque 522, a zero torque 524, and a maximum positive torque 526. Corresponding noise thresholds 532 and 536 are also indicated for the respective maximum negative torque 522 and maximum positive torque 526.

Figure 6:
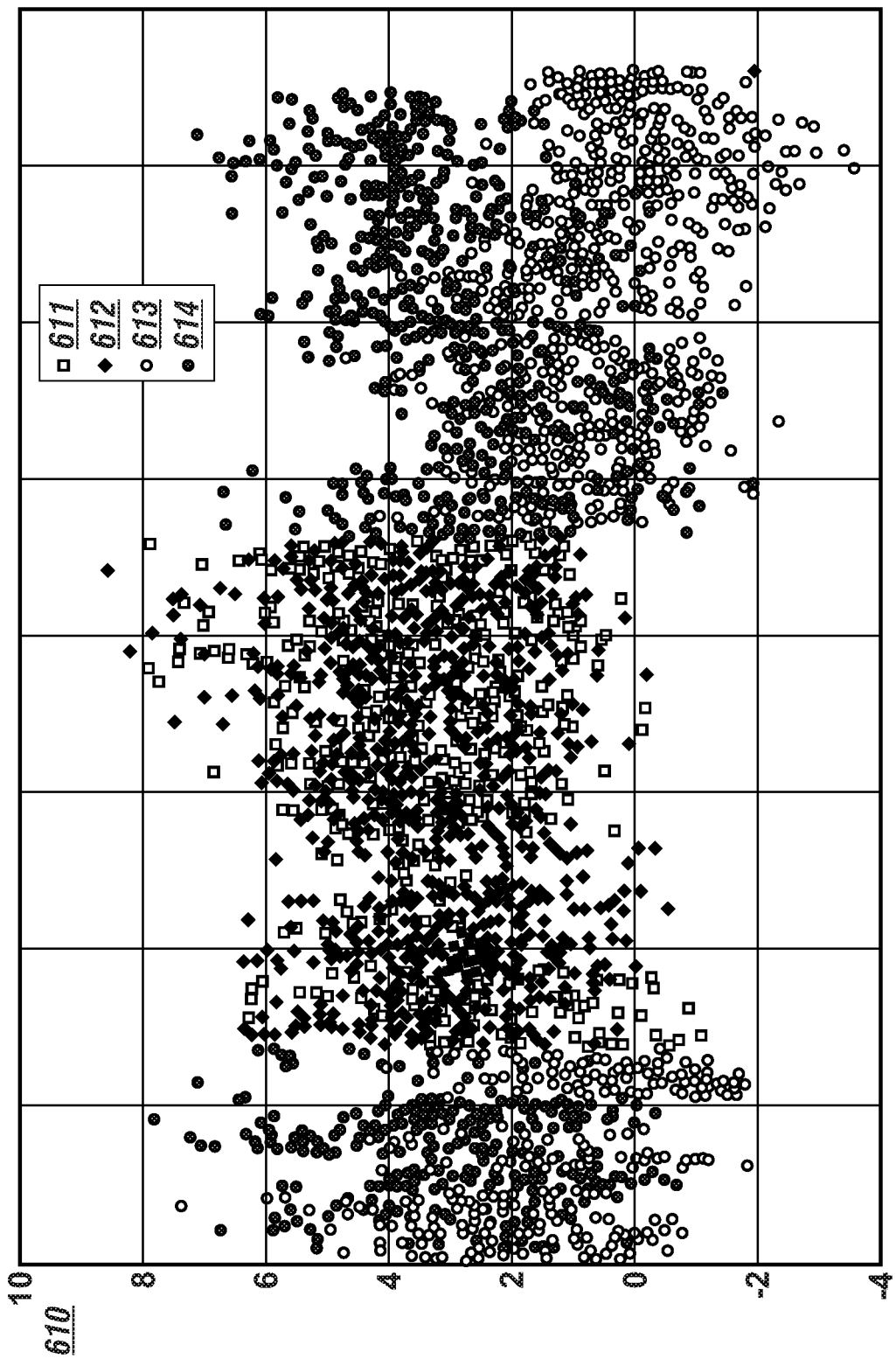
FIG. 6 graphically shows noise level results associated with execution of a noise/vibration test on a multitude of samples of a final differential assembly, in accordance with the disclosure.
Figure 7:
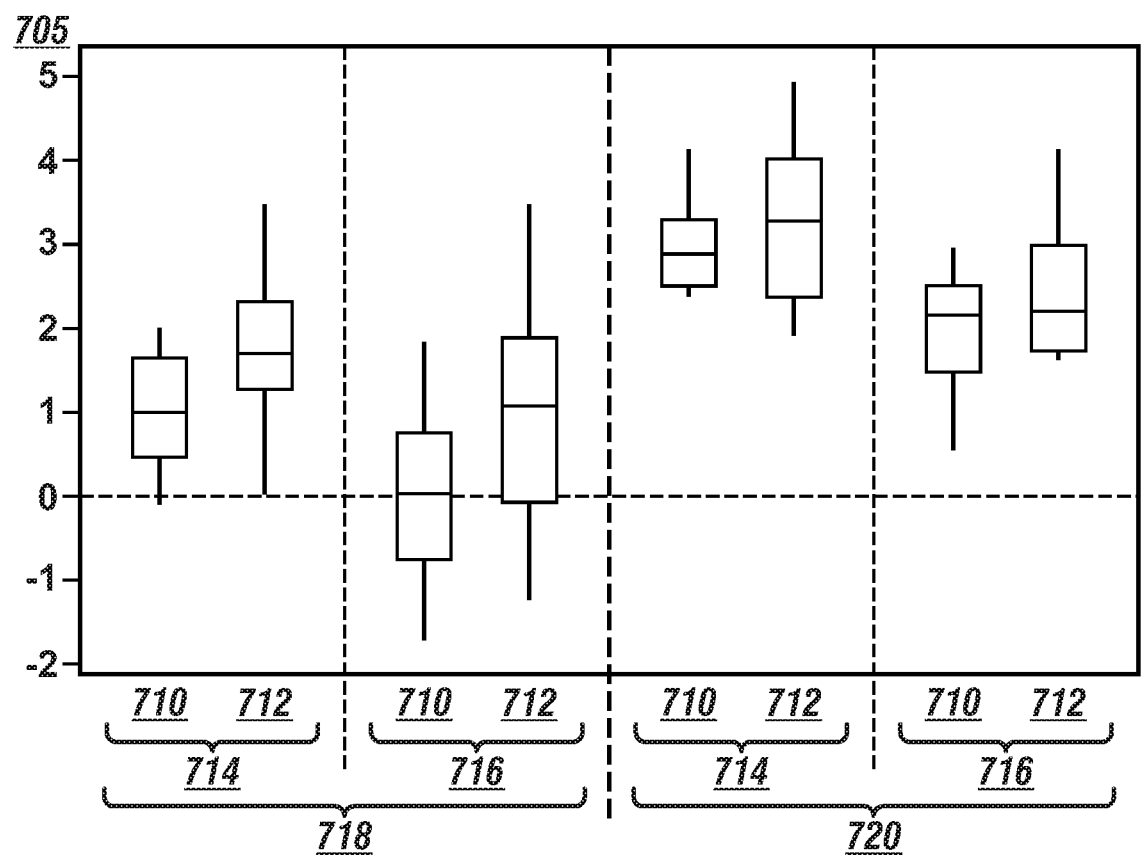
FIG. 7 graphically shows the noise level results of FIG. 6 that have been sorted based upon individual process machines, including average noise levels (in decibels) and associated standard deviation levels, in accordance with the disclosure.

FIG. 6 graphically shows results associated with the noise/vibration test 372, including maximum noise levels for each of a multitude of samples of the final differential assembly 365. The maximum noise levels 610 are indicated on the vertical axis in decibels, and time of the sample test is indicated on the horizontal axis. Different symbols indicate different ones of the machines that are employed to manufacture individual parts, as described with reference to FIG. 3. Maximum noise levels associated with a first machine 611, a second machine 612, a third machine 613 and a fourth machine 614 are shown. FIG. 7 graphically shows the noise level results of FIG. 6 that have been sorted based upon individual process machines. The results include average noise levels (in decibels) and associated standard deviation levels, which are indicated on the vertical axis (in decibels) 705, and are parsed to individually identify noise levels associated with the first and second lap machines 710, 712, respectively, the first and second grinding machines 714, 716, respectively, and first and second hard turning machines 718, 720, respectively. The results indicate that correlation and separation can be achieved between different ones of the aforementioned process machines. The correlation and separation are employable to direct adjustment of one of the first and second lap machines 710, 712, the first and second grinding machines 714, 716, and the first and second hard turning machines 718, 720, to reduce the noise level.

Referring again to FIG. 3, the analysis step 374 includes evaluating the set of parameters associated with the first measurement process 314, the set of parameters associated with the second measurement process 320, the set of parameters associated with the third measurement process 334, the set of parameters associated with the fourth measurement process 340, the set of parameters associated with the single-flank test 354 in view of the parameters associated with the noise/vibration (NV) test 372. Furthermore, each of the tooth-cutting process 312 to cut the ring gear, the tooth-cutting process 332 to cut the pinion gear, the grinding processes 318 and 338 (when employed), the lapping process 352 (when employed), and the single-flank test 354 may be executed by multiple machine tools, which are captured and indexed as part of the dataset shown with reference to FIG. 4.

The analysis step 374 includes executing a correlation analysis between the first set of parameters, the second set of parameters, the third set of parameters, the multiple machine tools, and the results of the noise/vibration test. The correlation analysis may be executed by a statistical analysis tool that is capable of executing correlation analysis.

Referring again to FIG. 3, the results of the analysis step 374 may be employed to identify and provide adjustment to an individual machine tool associated with one of the first gear forming event 310, the second gear forming event 330, the pairing process 350, and the final assembly event 360 based upon the evaluation of the results from the noise/vibration test 372, as indicated by the process adjustment step 380. The adjustment to individual machine tools to achieve uniformity of result with other machine tools that are employed to execute the respective one of the first gear forming event 310, the second gear forming event 330, the pairing process 350, and the final assembly event 360 is understood by skilled practitioners, and thus not described in detail herein.

A method is described, that include integrating a gear cutting/grinding/lapping process and assembly position process for manufacturing a bevel gear assembly such as a hypoid gear to maximize production first time quality in response to generated noise. The method includes integrating hypoid gear design/process (grind/lap), and assembly (build to position, and best build window) and end-of-line noise testing to maximize production end-of-line first time quality.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for manufacturing a final gear assembly that includes a bevel gear, the method comprising:
    forming, via a first process, a ring gear, and determining a first set of parameters associated with the ring gear;
    forming, via a second process, a pinion gear, and determining a second set of parameters associated with the pinion gear;

pairing, via a pairing process, the ring gear and the pinion gear, including meshingly engaging the ring gear and the pinion gear;

executing a test of the meshingly engaged paired ring gear and pinion gear, and determining a third set of parameters associated with the test;

assembling, via an assembly process, the paired ring gear and pinion gear into a final gear assembly;

executing a noise/vibration (NV) analysis of the final gear assembly;

evaluating the first set of parameters, the second set of parameters, and the third set of parameters based upon results of the NV analysis; and adjusting one of the first process, the second process, the pairing process, and the assembly process based upon the evaluating.

2. The method of claim 1, wherein the assembling, via the assembly process, the paired ring gear and pinion gear into the final gear assembly includes selecting a differential bearing shim and selecting a pinion shim; and wherein the adjusting one of the first process, the second process, the pairing process, and the assembly process based upon the evaluating comprises adjusting a size of one of the differential bearing shim and the pinion shim.

3. The method of claim 1, wherein executing the test of the meshingly engaged paired ring gear and pinion gear comprises executing a single-flank test of the meshingly engaged paired ring gear and pinion gear, and wherein assembling, via the assembly process, the paired ring gear and pinion gear into the final gear assembly comprises selecting a differential bearing shim and selecting a pinion shim based upon the single-flank test of the meshingly engaged paired ring gear and pinion gear.

4. The method of claim 3, wherein executing the single-flank test of the meshingly engaged paired ring gear and pinion gear comprises executing the single-flank test at multiple pinion positions and a constant backlash.

5. The method of claim 1, wherein executing the NV analysis of the final gear assembly comprises subjecting the final gear assembly to fixed-speed, torque sweep conditions and concurrently monitoring noise/vibration parameters.

6. The method of claim 5, wherein subjecting the final gear assembly to fixed-speed, torque sweep conditions and concurrently monitoring noise/vibration parameters comprises operating the final gear assembly at a preset speed and varying torque being transmitted through the final gear assembly to sweep between a maximum positive torque and a maximum negative torque, and coincidently determining a magnitude of noise/vibration generated by the final gear assembly.

7. The method of claim 1, wherein executing the NV analysis of the final gear assembly comprises subjecting the final gear assembly to fixed-torque, speed sweep conditions and concurrently monitoring noise/vibration parameters.

8. The method of claim 1, wherein executing the NV analysis of the final gear assembly comprises subjecting the final gear assembly to fixed-speed conditions and executing incremental step changes in torque from a maximum positive torque condition to a maximum negative torque condition and concurrently monitoring noise/vibration parameters.

9. The method of claim 1, wherein evaluating the first set of parameters, the second set of parameters, and the third set of parameters based upon results of the NV analysis comprises executing a correlation analysis between the first set of parameters, the second set of parameters, the third set of parameters and the NV analysis.

10. A method for manufacturing a differential assembly including a hypoid gear assembly disposed in a housing, the method comprising:

forming, via a first process, a ring gear of the hypoid gear assembly, and determining a first set of parameters associated with the ring gear;

forming, via a second process, a pinion gear of the hypoid gear assembly, and determining a second set of parameters associated with the pinion gear;

pairing, via a pairing process, the ring gear and the pinion gear to form the hypoid gear assembly, including meshingly engaging the ring gear and the pinion gear;

executing a test of the hypoid gear assembly, and determining a third set of parameters associated with the test;

assembling, via an assembly process, the hypoid gear assembly into the housing of the differential assembly;

executing a noise/vibration (NV) analysis of the differential assembly;

evaluating the first set of parameters, the second set of parameters, and the third set of parameters based upon results of the NV analysis; and adjusting one of the first process, the second process, the pairing process, and the assembly process based upon the evaluating.

11. The method of claim 10, wherein executing the test of the hypoid gear assembly comprises executing a single-flank test of the hypoid gear assembly at multiple pinion positions and a constant backlash.

12. The method of claim 10, wherein executing the NV analysis of the differential assembly comprises subjecting the differential assembly to fixed-speed, torque sweep conditions and concurrently monitoring noise/vibration parameters.

13. The method of claim 12, wherein subjecting the differential assembly to fixed-speed, torque sweep conditions and concurrently monitoring noise/vibration parameters comprises operating the differential assembly at a preset speed and varying torque being transmitted through the differential assembly to sweep between a maximum positive torque and a maximum negative torque, and coincidently determining a magnitude of noise/vibration generated by the differential assembly.

14. The method of claim 10, wherein executing the NV analysis of the differential assembly comprises subjecting the differential assembly to fixed-torque, speed sweep conditions and concurrently monitoring noise/vibration parameters.

15. The method of claim 10, wherein executing the NV analysis of the differential assembly comprises subjecting the differential assembly to fixed-speed conditions and executing incremental step changes in torque from a maximum positive torque condition to a maximum negative torque condition and concurrently monitoring noise/vibration parameters.

16. The method of claim 10, wherein evaluating the first set of parameters, the second set of parameters, and the third set of parameters based upon results of the noise/vibration test comprises executing a correlation analysis between the first set of parameters, the second set of parameters, the third set of parameters and the results of the NV analysis.

17. The method of claim 10, wherein assembling, via the assembly process, the hypoid gear assembly into the housing of the differential assembly includes selecting a differential bearing shim and selecting a pinion shim; and wherein adjusting the assembly process based upon the evaluation of the NV analysis comprises adjusting a size of one of the differential bearing shim and the pinion shim.

18. The method of claim 17, wherein executing the test of the hypoid gear assembly comprises executing a single-flank test of the hypoid gear assembly, and wherein assembling, via the assembly process, the hypoid gear assembly into the differential assembly comprises selecting a differential bearing shim and selecting a pinion shim based upon the single-flank test of the hypoid gear assembly.

19. The method of claim 18, wherein executing the single-flank test of the meshingly engaged paired ring gear and pinion gear comprises executing the single-flank test at multiple pinion positions and a constant backlash.

* * * * *